United States Patent
Van Cauteren et al.

(10) Patent No.: US 9,952,396 B2
(45) Date of Patent: Apr. 24, 2018

(54) SYSTEM AND METHOD OF FIBER DISTRIBUTION

(71) Applicant: CommScope Connectivity Belgium BVBA, Kessel-Lo (BE)

(72) Inventors: Gerd Van Cauteren, Hamme (BE); Dirk Kempeneers, Aarschot (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 14/870,766

(22) Filed: Sep. 30, 2015

(65) Prior Publication Data
US 2016/0091684 A1    Mar. 31, 2016

Related U.S. Application Data

(60) Provisional application No. 62/057,540, filed on Sep. 30, 2014.

(51) Int. Cl.
G02B 6/44      (2006.01)
G02B 6/42      (2006.01)
G02B 6/38      (2006.01)

(52) U.S. Cl.
CPC ......... *G02B 6/4448* (2013.01); *G02B 6/3897* (2013.01); *G02B 6/4269* (2013.01);
(Continued)

(58) Field of Classification Search
CPC .. G02B 6/4448; G02B 6/3897; G02B 6/4269; G02B 6/4278; G02B 6/4285; G02B 6/4447; G02B 6/445; G02B 6/4494
See application file for complete search history.

(56) References Cited

U.S. PATENT DOCUMENTS

| 4,998,894 A | * | 3/1991 | Gronvall | G02B 6/4447 439/133 |
| 5,029,958 A | * | 7/1991 | Hodge | G02B 6/4201 385/100 |

(Continued)

FOREIGN PATENT DOCUMENTS

| DE | 19740246 C1 * | 2/1999 | ........... G02B 6/4448 |
| EP | 0 715 386 A1 | 6/1996 | |

(Continued)

OTHER PUBLICATIONS

Cisco Aironet 1520 Series Outdoor Mesh Access Point Hardware Installation Guide, Section "Connecting a Fiber-Optic Cable to the Access Point", 5 pages (Jun. 2011).

(Continued)

*Primary Examiner* — Peter Radkowski
(74) *Attorney, Agent, or Firm* — Merchant & Gould P.C.

(57) ABSTRACT

A closure (15) is installed at a network distribution point to facilitate upgrading a subscriber network (10) to extend optical fibers closer to the subscribers (18). The closure (15) may include active equipment to convert optical signals to electrical signals. The closure (15) enables a plug-and-play connection to the active equipment to facilitate installing and/or upgrading active equipment at the closure (15). The closure (15) also is expandable to enable drop cables (or other optical cable) to be routed from the closure (15) towards the subscribers (18).

21 Claims, 8 Drawing Sheets

(52) U.S. Cl.
CPC ......... *G02B 6/4278* (2013.01); *G02B 6/4285* (2013.01); *G02B 6/445* (2013.01); *G02B 6/4447* (2013.01); *G02B 6/4494* (2013.01)

(56) References Cited

U.S. PATENT DOCUMENTS

| | | | | |
|---|---|---|---|---|
| 5,668,911 | A * | 9/1997 | Debortoli | G02B 6/4446 385/135 |
| 5,892,872 | A * | 4/1999 | Glover | G02B 6/4446 361/816 |
| 6,427,045 | B1 * | 7/2002 | Matthes | G02B 6/445 385/134 |
| 7,013,074 | B2 | 3/2006 | Battey et al. | |
| 7,292,763 | B2 | 11/2007 | Smith et al. | |
| 7,349,616 | B1 * | 3/2008 | Castonguay | G02B 6/445 385/125 |
| 7,397,997 | B2 | 7/2008 | Ferris et al. | |
| 7,400,815 | B2 | 7/2008 | Mertesdorf et al. | |
| 7,480,437 | B2 | 1/2009 | Ferris et al. | |
| 7,539,387 | B2 | 5/2009 | Mertesdorf et al. | |
| 7,539,388 | B2 | 5/2009 | Mertesdorf et al. | |
| 7,744,286 | B2 | 6/2010 | Lu et al. | |
| 7,744,288 | B2 * | 6/2010 | Lu | G02B 6/3816 385/60 |
| 7,751,675 | B2 * | 7/2010 | Holmberg | G02B 6/4446 385/134 |
| 7,762,726 | B2 | 7/2010 | Lu et al. | |
| 7,941,027 | B2 | 5/2011 | Mertesdorf et al. | |
| 7,942,590 | B2 | 5/2011 | Lu et al. | |
| 7,959,361 | B2 | 6/2011 | Lu et al. | |
| 8,020,813 | B1 * | 9/2011 | Clark | G02B 6/445 248/74.2 |
| 8,135,256 | B2 | 3/2012 | Solheid et al. | |
| 8,202,008 | B2 | 6/2012 | Lu et al. | |
| 8,213,760 | B2 * | 7/2012 | Rudenick | G02B 6/4455 385/134 |
| 8,244,090 | B2 * | 8/2012 | Kutsuzawa | G02B 6/445 385/135 |
| 8,254,741 | B2 * | 8/2012 | Imaizumi | G02B 6/4446 385/100 |
| RE43,762 | E | 10/2012 | Smith et al. | |
| 8,363,999 | B2 | 1/2013 | Mertesdorf et al. | |
| 8,414,196 | B2 | 4/2013 | Lu et al. | |
| 9,008,483 | B2 * | 4/2015 | Larsson | G02B 6/445 385/135 |
| 9,151,922 | B2 * | 10/2015 | Claessens | G02B 6/4477 |
| 2005/0276562 | A1 * | 12/2005 | Battey | G02B 6/4454 385/135 |
| 2008/0131132 | A1 * | 6/2008 | Solheid | G02B 6/4441 398/117 |
| 2009/0148102 | A1 * | 6/2009 | Lu | G02B 6/3816 385/60 |
| 2009/0202214 | A1 * | 8/2009 | Holmberg | G02B 6/4446 385/135 |
| 2009/0310927 | A1 * | 12/2009 | Riggsby | G02B 6/4471 385/135 |
| 2010/0074578 | A1 * | 3/2010 | Imaizumi | G02B 6/4446 385/24 |
| 2010/0189404 | A1 * | 7/2010 | Rudenick | G02B 6/4455 385/135 |
| 2010/0329622 | A1 * | 12/2010 | Kutsuzawa | G02B 6/445 385/135 |
| 2011/0013875 | A1 * | 1/2011 | Bran de Leon | G02B 6/445 385/135 |
| 2011/0305422 | A1 * | 12/2011 | Thompson | G02B 6/4446 385/94 |
| 2012/0321268 | A1 * | 12/2012 | Claessens | G02B 6/4477 385/135 |
| 2014/0023334 | A1 * | 1/2014 | Larsson | G02B 6/445 385/135 |
| 2014/0133804 | A1 | 5/2014 | Lu et al. | |
| 2015/0276562 | A1 | 10/2015 | Fraden et al. | |

FOREIGN PATENT DOCUMENTS

| | | | | |
|---|---|---|---|---|
| JP | 2006-13601 | | 1/2006 | |
| WO | WO 0165295 | A1 * | 9/2001 | ........ G02B 6/4448 |
| WO | WO 02071123 | A1 * | 9/2002 | ........ G02B 6/4201 |
| WO | WO 2005045487 | A2 * | 5/2005 | ........ G02B 6/4453 |
| WO | WO 2005045487 | A3 * | 8/2005 | ........ G02B 6/4453 |
| WO | WO 2008062222 | A2 * | 5/2008 | ........ H04Q 1/142 |
| WO | WO 2011/080278 | A1 | 7/2011 | |
| WO | WO 2012138856 | A1 * | 10/2012 | ........ G02B 6/445 |
| WO | WO 2013092250 | A1 * | 6/2013 | ........ H04Q 1/026 |
| WO | WO 2015/158687 | A1 | 10/2015 | |

OTHER PUBLICATIONS

International Search Report and Written Opinion for Application No. PCT/EP2015/072504 dated Nov. 17, 2015.

* cited by examiner

SYSTEM AND METHOD OF FIBER DISTRIBUTION

CROSS REFERENCE TO RELATED APPLICATION

This application claims the benefit of U.S. Provisional Application No. 62/057,540, filed Sep. 30, 2014, and titled "System and Method of Fiber Distribution," the disclosure of which is hereby incorporated herein by reference.

BACKGROUND

Fiber to the distribution point (FTTdp) is a fiber-optic based communication delivery network in which optical fibers are run in an optical distribution network from a central office to locations (i.e., distribution points) located near subscribers. Electrical cables complete the network, extending from the distribution points to the subscribers (e.g., to Optical Network Terminals or other subscriber equipment). The optical signals carried by the optical fibers are converted into electrical signals, which are carried by the electrical cables the remaining distance to the subscribers.

Improvements are desired.

SUMMARY

The present disclosure provides a system and method that facilitates the transition between optical signals to electrical signals in the field. The present disclosure also facilitates upgrading the network to extend the fibers closer to, or all the way to, the premises. In certain examples, the system and method according to the present disclosure enables the transition from optical to electrical to be accomplished without field splicing.

In accordance with some aspects of the disclosure, a closure includes a fiber management module; an active equipment module; and a fiber line. The fiber management module has a sealed fiber connection location accessible from an exterior of the fiber management module. The active equipment module is coupled to the fiber management module to form a sealed enclosure. The active equipment module has a sealed electrical connection location accessible from an exterior of the active equipment module. The active equipment module contains a fiber-to-electrical signal converter that is electrically coupled to the sealed electrical connection location. The fiber line connects the sealed fiber connection location to the fiber-to-electrical signal converter.

In certain examples, the active equipment module is removably coupled to the fiber management module. In an example, a watertight gasket is disposed between the fiber management module and the active equipment module. In an example, the active equipment module is pivotally coupled to the fiber management module to move between a closed position and an open position. The fiber line is not accessible from an exterior of the closure when the active equipment module is disposed in the closed position. The fiber line is accessible when the active equipment module is disposed in the open position.

In certain examples, the fiber management module includes a plastic housing body; and the active equipment module includes a module body configured to dissipate heat. In an example, the module body includes fins. In an example, the module body includes metal.

In certain examples, a jumper cable has a first connectorized end plugged into an optical adaptor at the first sealed fiber connection location. The fiber line is optically coupled to the first connectorized end. In examples, the sealed fiber connection location of the fiber management module is a first sealed fiber connection location. The fiber management module has a second sealed fiber connection location. The jumper cable extends from the first connectorized end to a second connectorized end that is plugged into the second sealed fiber connection location.

In examples, the first and second sealed fiber connection locations include ruggedized multi-fiber optical adaptors. The first and second connectorized ends of the jumper cable include multi-fiber connectors. In an example, the second connectorized end of the jumper cable terminates fewer optical fibers than the first connectorized end of the jumper cable. In an example, at least a first optical fiber terminated at the first connectorized end of the jumper cable has a distal end terminated by a single-optical connector.

In an example, the single-optical connector is routed to an optical adaptor disposed within an interior of the fiber management module. The active equipment module includes a fiber pigtail extending outwardly from the active equipment module and routed to the optical adaptor to interface with the single-optical connector to form the fiber line. In an example, at least a second optical fiber terminated at the first connectorized end of the jumper cable has a distal end that is left unterminated, the unterminated distal end being disposed within the fiber management module.

In certain examples, the fiber line includes a fiber pigtail extends outwardly from the active equipment module. The fiber pigtail has a connectorized end disposed exterior of the active equipment module.

In examples, an expansion module is configured to mount between the fiber management module and the active equipment module. The expansion module has a sealed drop fiber connection location connecting to the first sealed fiber connection location. In an example, the sealed drop fiber connection location is configured to receive fewer fibers than the sealed fiber connection location.

In certain examples, the fiber-to-electrical signal converter is sealed within the active equipment module.

In certain examples, the sealed fiber connection location is adapted to mate with a ruggedized multi-fiber connector from outside the fiber management module. In certain examples, the sealed electrical connection location is adapted to mate with a ruggedized multi-fiber connector from outside the fiber management module.

In certain examples, the active equipment module includes factory installed internal components. In certain examples, the active equipment module includes factory installed internal components and has a tamper proof construction.

In certain examples, the closure is a plug-and-play connection between fiber input of the fiber management module and electrical outputs of the active equipment module.

In accordance with some aspects of the disclosure, a method of upgrading communication signals over a subscriber network includes plugging a feeder cable into a sealed fiber connection location of a fiber management module; routing the optical signals from the sealed fiber connection location to a fiber-to-electrical converter disposed within a sealed active equipment module; and plugging an electrical cable into a sealed electrical connection location of the sealed active equipment module.

In certain examples, routing the optical signals from the sealed fiber connection location to a fiber-to-electrical converter includes connecting a first end of a jumper cable to the sealed fiber connection location. The jumper cable includes optical fibers. At least one of the optical fibers is terminated at a second end of the jumper cable by an optical connector. The method also includes plugging the optical connector into an optical adaptor disposed within the fiber management module; and plugging a connectorized end of a fiber pigtail that extends out of the sealed active equipment module into the optical adaptor.

In certain examples, the method also includes upgrading active equipment of the closure by unplugging the connectorized end of the fiber pigtail; removing the sealed active equipment module from the fiber management module; attaching a new sealed active equipment module to the fiber management module; and plugging a connectorized end of a fiber pigtail that extends out of the new sealed active equipment module into the optical adaptor. The new sealed active equipment module contains upgraded active equipment.

In certain examples, the method also includes separating the sealed active equipment module from the fiber management module; positioning an expansion module between the sealed active equipment module and the fiber management module so that the expansion module seals to the active equipment module and seals to the fiber management module to form an expanded enclosure. The expansion module has a sealed drop fiber connection location. The method also includes routing a fiber line between the sealed fiber connection location of the fiber management module and the sealed drop fiber connection location. The fiber line is fully disposed within the expanded enclosure.

In examples, at least another of the optical fibers of the jumper cable is terminated at the second end of the jumper cable by another optical connector that is routed to the sealed drop fiber connection location. In examples, at least another of the optical fibers of the jumper cable is spliced to a drop fiber pigtail that extends into the expansion module from the sealed drop fiber connection location.

In examples, the method also includes connecting a drop cable to the sealed drop fiber connection location; and routing the drop cable to a subscriber.

In certain examples, the method also includes plugging a fiber distribution cable into another sealed fiber connection location of the fiber management module. The fiber distribution cable has fewer live optical fibers than the feeder cable.

DETAILED DESCRIPTION

Figure 1:
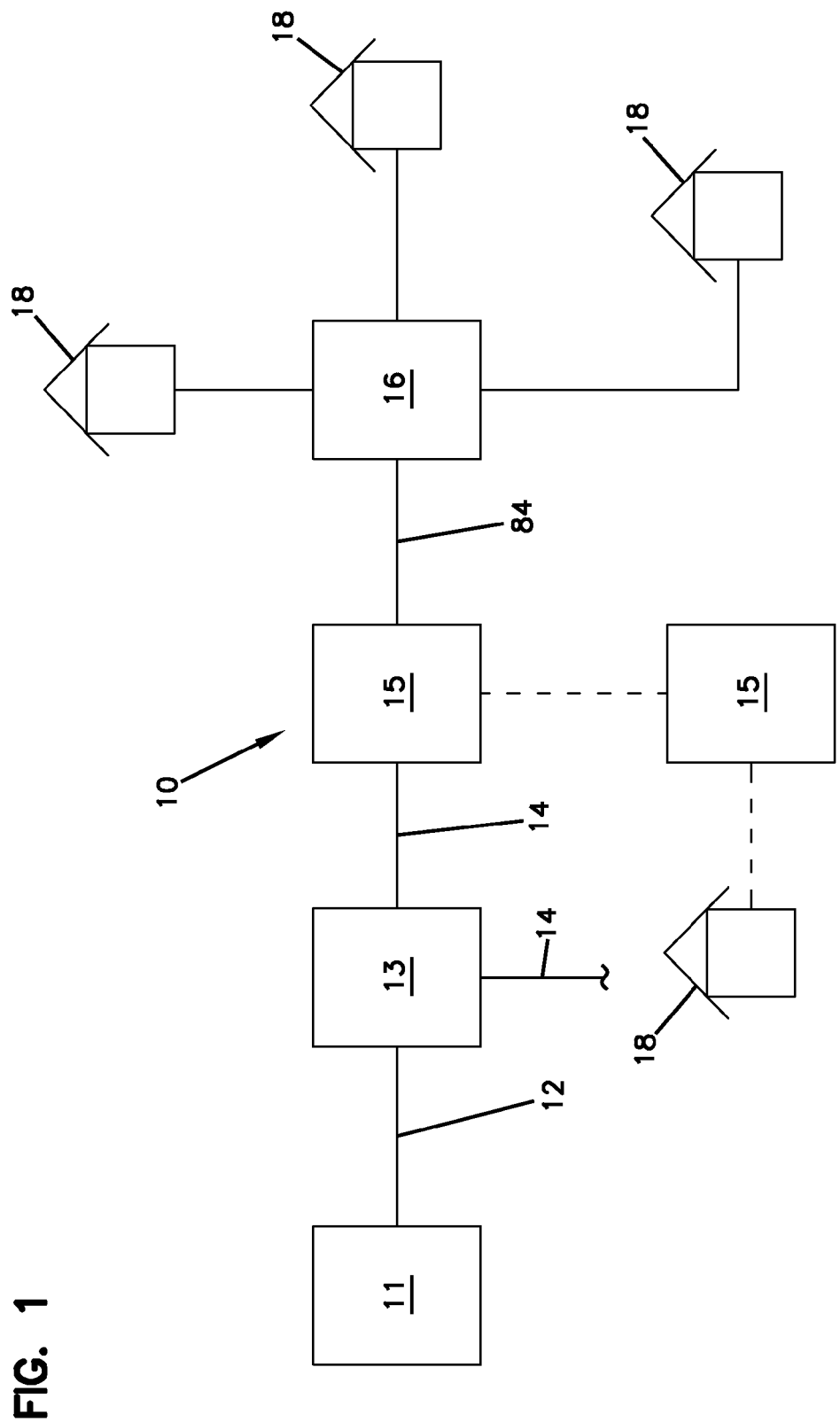
FIG. 1 is a schematic diagram of an example FTTdp network extending from a central office to subscribers in accordance with the principles of the present disclosure.

FIG. 1 depicts an example fiber to the premises network 10. The example network 10 includes a central office 11 from which a feeder cable 12 extends to one or more network nodes 13 (e.g., fiber distribution hubs). A distribution cable 14 extends from a node 13 to a closure 15 located at a distribution point in the network 10. In the example shown, the closure 15 receives optical signals from the fiber distribution cable 14 and converts the optical signals into electrical signals that are transmitted via an electrical cable 84 to an electrical distribution closure 16. At the electrical distribution closure 16, the electrical signals are separated and directed to the respective subscribers 18 (e.g., to an Optical Network Terminal at the subscriber 18). It will be understood, of course, that the signals can pass in either direction between the central office and the subscribers.

Figure 2:
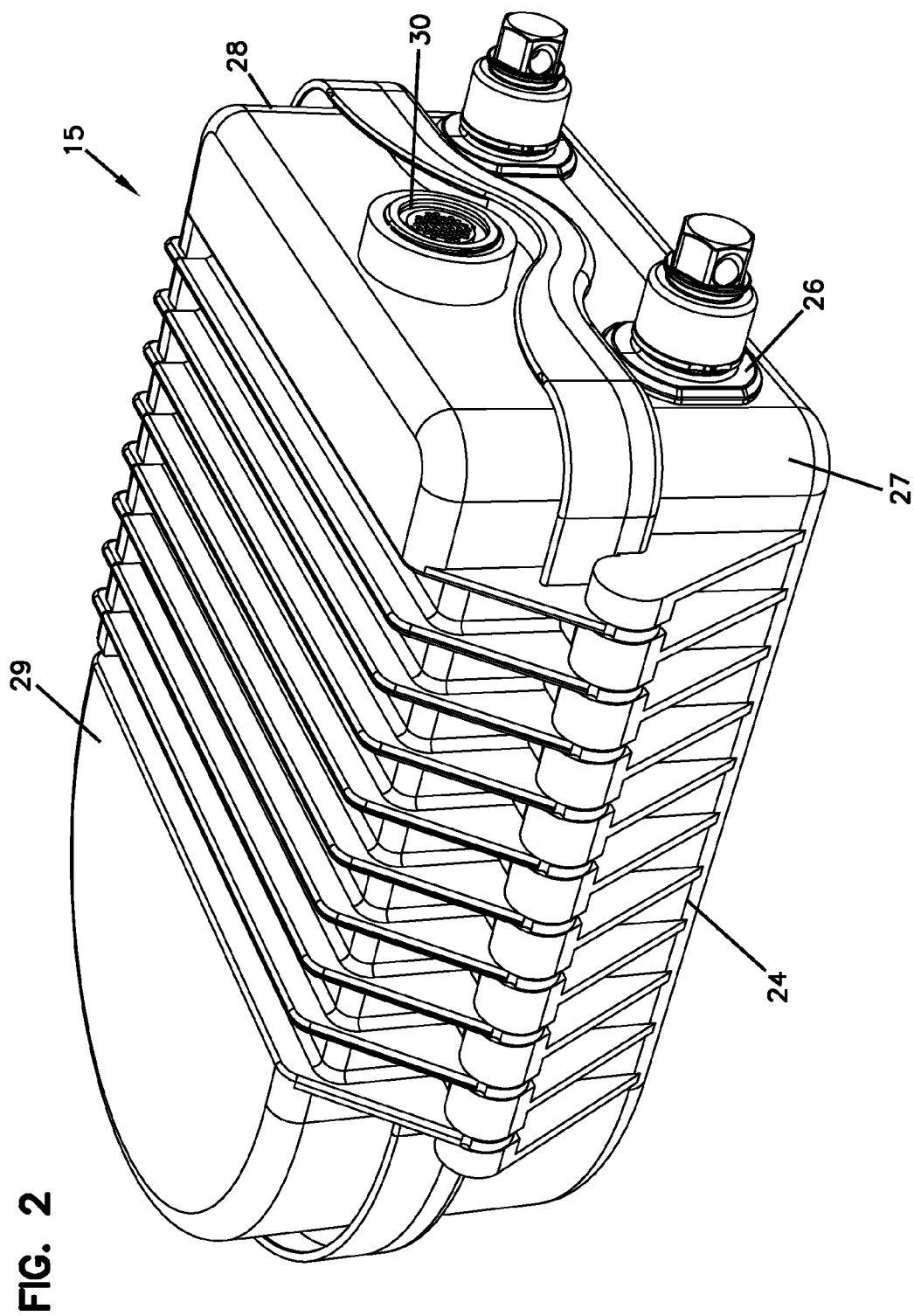
FIG. 2 is a perspective view of an example closure including a fiber management module and an active equipment module configured in accordance with the principles of the present disclosure.
Figure 3:
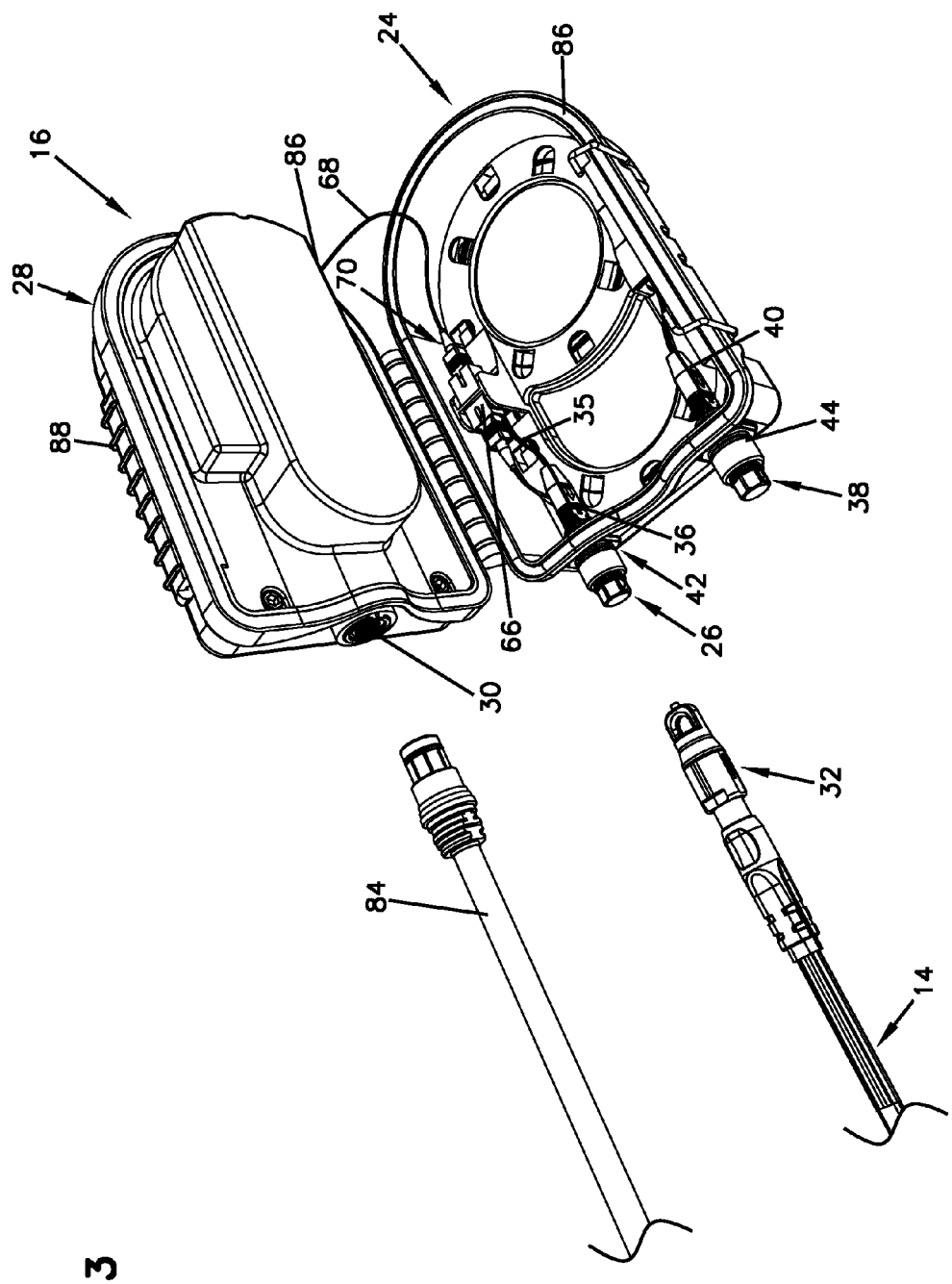
FIG. 3 is a perspective view of the closure of FIG. 2 in an open orientation.

FIGS. 2 and 3 illustrate an example closure 15 suitable for use in the network 10. In certain implementations, the closure 15 includes a fiber management module 24 and an active equipment module 28. The active equipment module 28 is coupled to the fiber management module 24 to cooperatively form a sealed enclosure. For example, the closure 15 includes a watertight gasket 86 disposed between the fiber management module 24 and the active equipment module 28 when closed. In an example, the watertight gasket 86 is carried by the fiber management module 24. In another example, the watertight gasket 86 is carried by the active equipment module 28.

In certain examples, the active equipment module 28 can be coupled to the fiber management module 24 so as to allow movement of the active equipment module 28 relative to the fiber management module 24 between a closed position (see FIG. 2) and an open position (see FIG. 3). The active equipment module 28 forms the sealed enclosure with the fiber management module 24 when in the closed position. In certain examples, the active equipment module 28 pivots relative to the fiber management module 24 between the open and closed positions. In certain examples, the active equipment module 28 is removable from the fiber management module 24 without harm to either module.

The fiber management module 24 defines a sealed fiber connection location 26 accessible from an exterior of the management module 24. In certain implementations, the sealed fiber connection location 26 is a ruggedized connection location. As the term is used herein, a "ruggedized" connection has a watertight seal and provides robust fastening.

In certain examples, the sealed fiber connection location 26 includes a ruggedized optical adapter carried by the fiber management module 24. For example, the ruggedized optical adapter forms a watertight seal with the management module 24. In various examples, either the optical adapter or the fiber management module 24 includes a robust fastener for attachment of an optical cable (e.g., the distribution cable 14) at the sealed fiber connection location 26. In examples, the robust fastener includes a twist-to-lock fastener. In an example, the robust fastener includes threading (e.g., an internally threaded sleeve, an externally threaded sleeve, etc.). In another example the robust fastener includes part of a bayonet connection.

The active equipment module 28 defines a sealed electrical connection location 30 accessible from an exterior of the active equipment module 28. In certain implementations, the sealed electrical connection location 30 includes a ruggedized electrical receptacle or connector. The sealed electrical connection location 30 enables the electrical cable 84 to connect to the active equipment module with a watertight seal. The sealed electrical connection location 30 also enables the electrical cable 84 to robustly attach to the active equipment module 28 (e.g., with a twist-to-lock fastener).

In certain implementations, the active equipment module 28 includes a fiber-to-electrical signal converter that is electrically coupled to the sealed electrical connection location 30. In certain examples, other types of active equipment (e.g., VDSL or G.fast technology) can be disposed within the active equipment module 28. In certain implementations, the signal converter is sealed within the active equipment module 28. In certain implementations, the active equipment module 28 has a tamper-proof construction to protect the active electronic equipment. In examples, the signal converter is sealed within the active equipment module 28 with a watertight gasket, ultrasonic weld, or other type of seal. In certain examples, the signal converter is disposed within the active equipment module 28 and electrically coupled to the connection location 30 at the factory before the closure 15 is installed in the field.

Optical signals received at the sealed fiber connection location 26 are routed within the closure 15 to the signal converter and then routed within the closure 15 to the sealed electrical connection location 30 as will be discussed in more detail herein. For example, optical signals can be received from the distribution cable 14 connected to the sealed fiber connection location 26. The optical signals are routed through the fiber management module 24 to the signal converter located within the active equipment module 28. In certain implementations, the optical signals are provided to the signal converter via a plug-and-play connection.

In examples, an optical adapter 66 is disposed within the fiber management module 24. The optical adapter 66 is accessible when the active equipment module 28 is moved to the open position relative to the fiber management module 24. The optical adapter 66 is not accessible when the active equipment module 28 is closed relative to the fiber management module 24. A first optical line 35 extends from an interior part of the sealed fiber connection location 26 to a first port of the optical adapter 66. A second optical line 68 extends outwardly from the active equipment module 28 to a second port of the optical adapter 66. The optical adapter 66 includes alignment structure the aligns the optical fibers of the first and second lines 35, 68.

In the example shown, the second optical line 68 includes a pigtail having a connectorized end 70 plugged into the second port. It should be appreciated, however, that the ends of fibers extending from the active equipment module 28 are not necessarily connectorized. For example, in one implementation, an unconnectorized end of the second fiber line 68 could be spliced to an unconnectorized end of the first optical line (e.g., to the second end of one of the fibers of the jumper cable 34 as will be discussed in more detail herein).

In some implementations, the signal converter may generate heat. In certain implementations, the active equipment module 28 may include other active equipment that generates heat. Accordingly, a body 29 of the active equipment module 28 is configured to dissipate heat from any active electric equipment (e.g., an optical-to-electrical signal converter) disposed within the active equipment module 28. In certain implementations, at least a portion of the body 29 is constructed of a heat dissipating material, such as metal. In certain implementations, one or more cooling fins 88 are disposed at an exterior portion of the body 29. In an example, the cooling fins 88 are constructed of metal. In some implementations, the fiber management module 24 includes a plastic body 27, which may be cheaper than a metal body. In other implementations, however, the fiber management module 24 may have a metal body 27.

In some implementations, a jumper cable 34 can be utilized with the fiber management system 24. The jumper cable 34 includes a first connectorized end 36 that connects to an interior of the first sealed fiber connection location 26. For example, the first connectorized end 36 can be received at an internal port of a ruggedized optical adapter, which aligns the optical fiber(s) of the jumper cable 34 with the optical fiber(s) of the distribution cable 14. At least a portion of the jumper cable 34 forms the first optical line 35. In the example shown, the jumper cable 34 is not accessible from an exterior of the closure 15 when the active equipment module 28 and fiber management module 24 are disposed in the closed position (see FIG. 2). The jumper cable 34 is accessible when the active equipment module 28 is disposed in the open position (see FIG. 3).

In some implementations, the sealed fiber connection location 26 of the fiber management module 24 is one of multiple sealed fiber connection locations. For example, the management module 24 can include a first sealed fiber connection location 26 and a second sealed fiber connection location 38. In the example shown, the jumper cable 34 extends from the first connectorized end 36 to a second connectorized end 40. The second connectorized end 40 is connected to the second sealed fiber connection location 38 at an interior of the management module 24. For example, the first and second sealed fiber connection locations 26, 38 can each include a ruggedized multi-fiber optical adaptor 42, 44; the first and second connectorized ends 36, 40 of the jumper cable 34 include multi-fiber connectors that mate with interior ports of the ruggedized adaptors 42, 44. Accordingly, any optical signals received at the first sealed fiber connection location 26 are carried to the second sealed fiber connection location 38.

Figure 4:
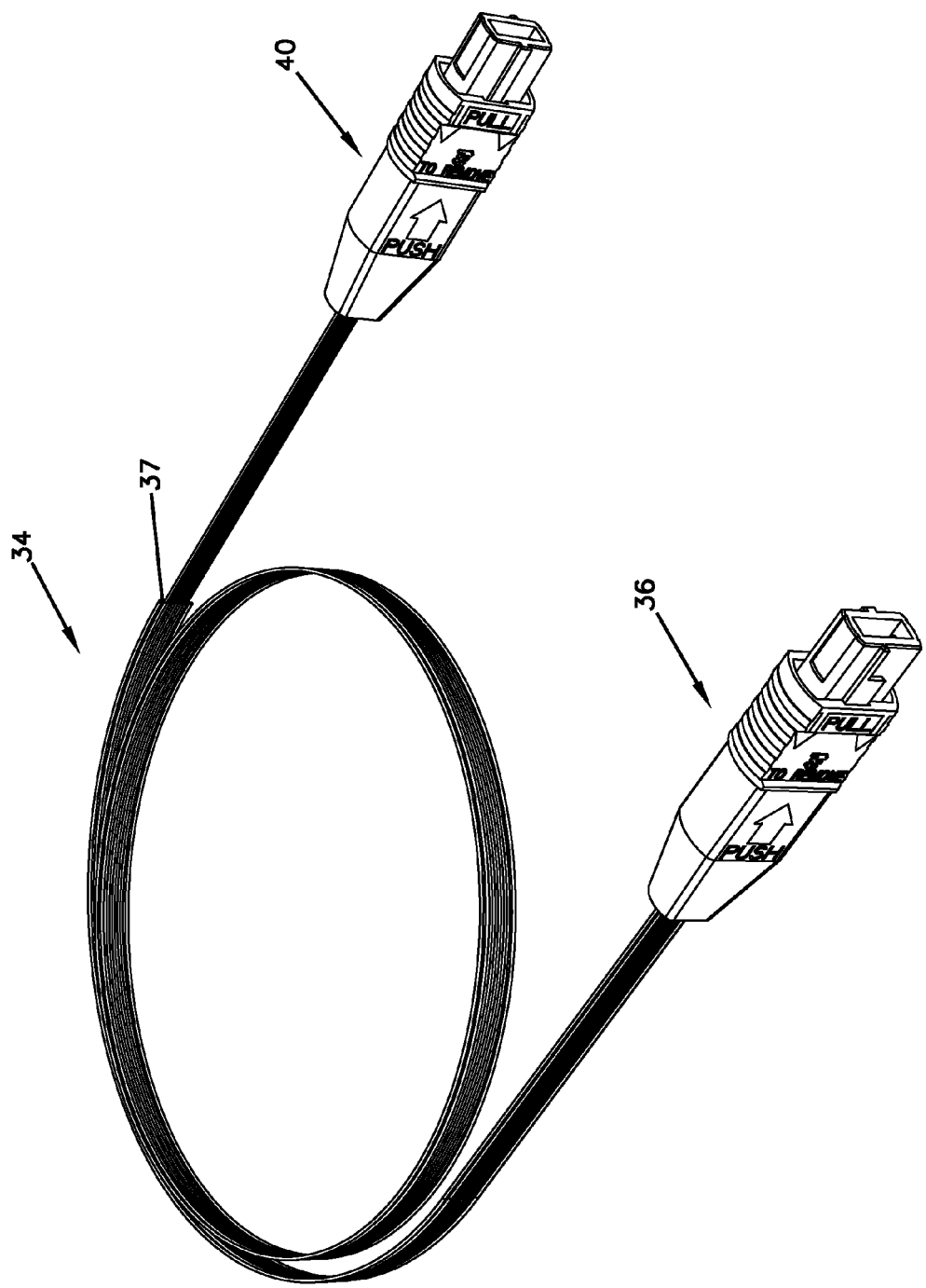
FIG. 4 is a perspective view of a first example fiber jumper cable suitable to be used with the closure of FIG. 2.
Figure 5:
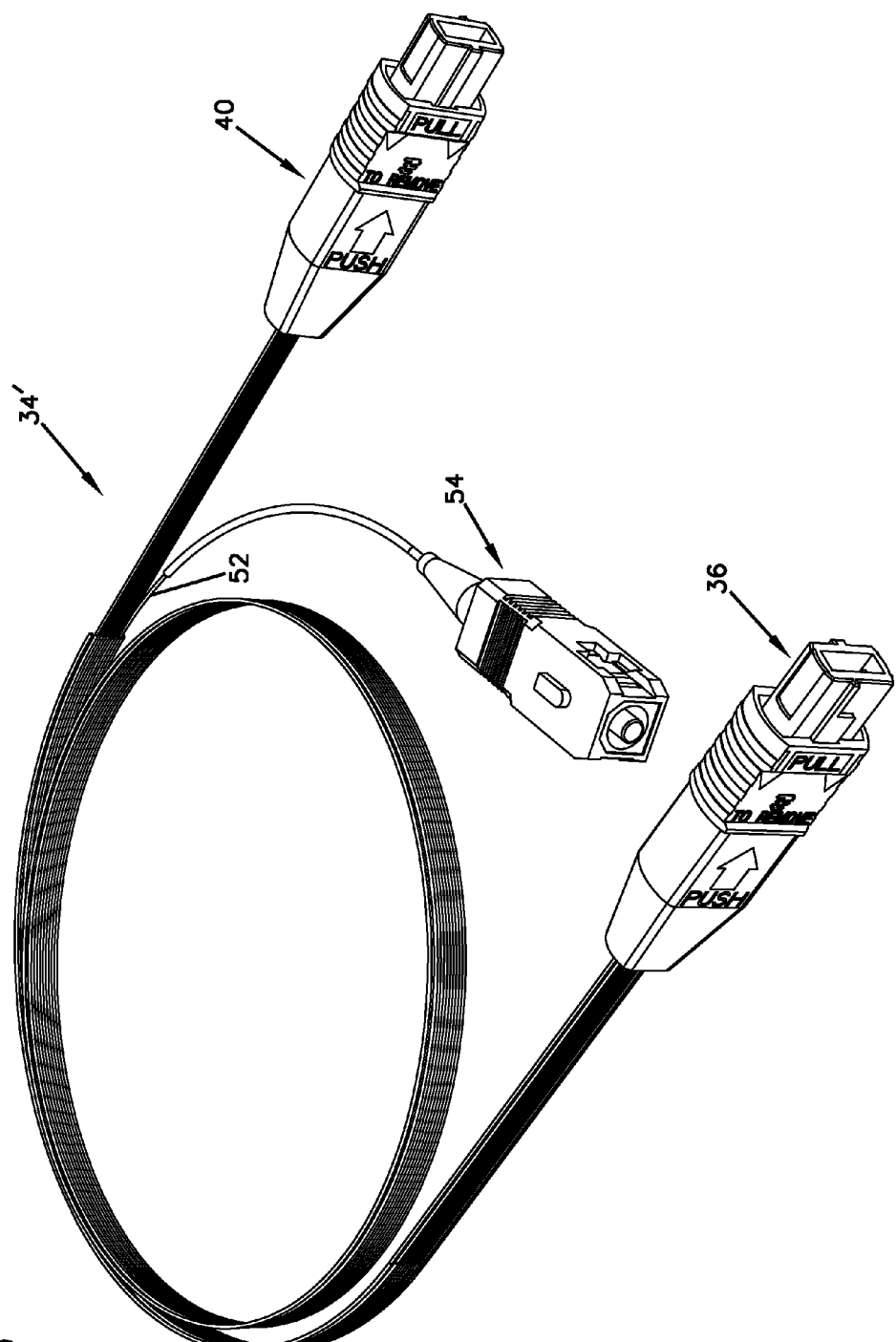
FIG. 5 is a perspective view of a second example fiber jumper cable suitable to be used with the closure of FIG. 2.
Figure 6:
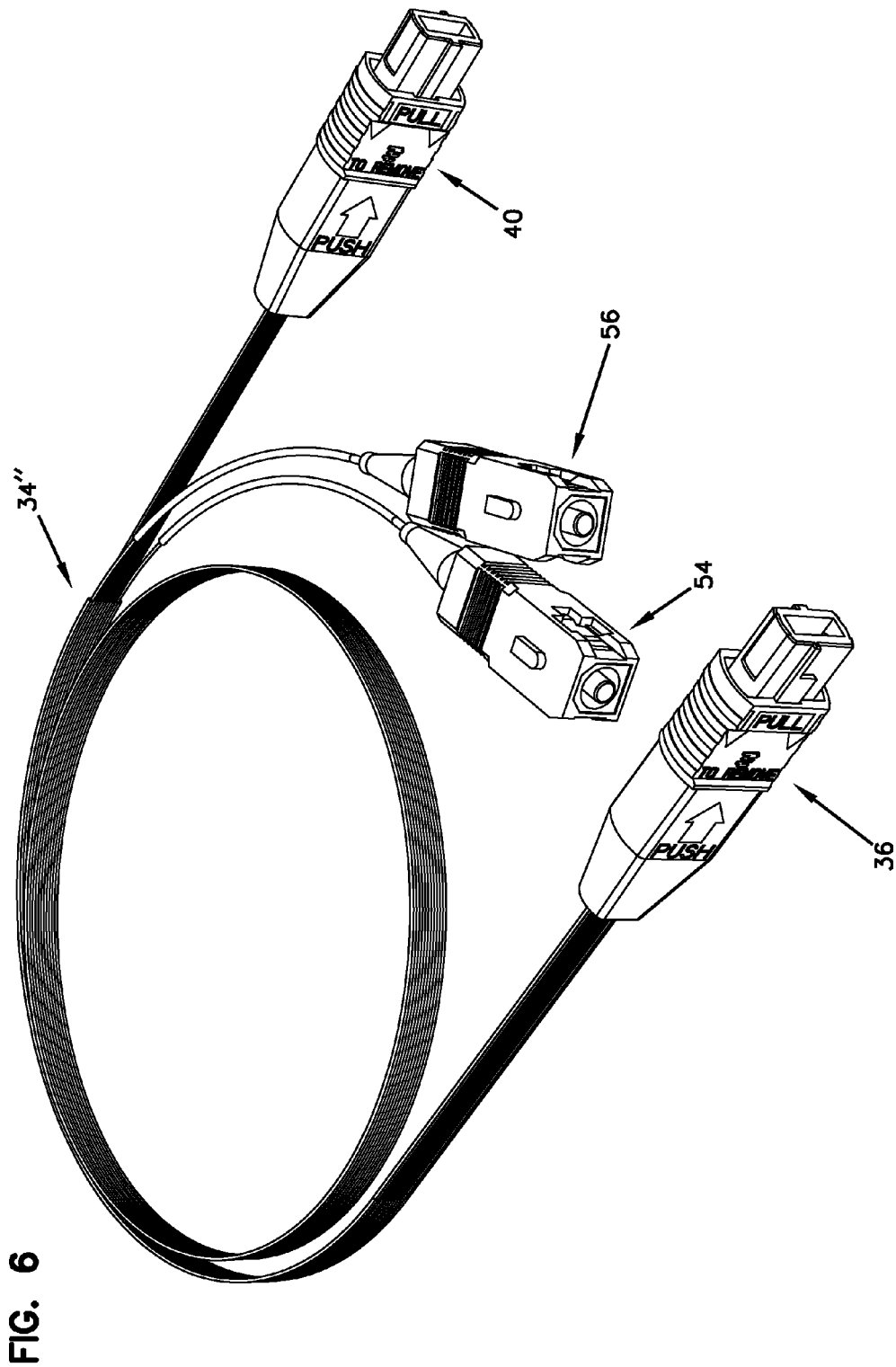
FIG. 6 is a perspective view of a third example fiber cable closure of FIG. 2.

Referring to FIGS. 4-6, the jumper cable 34 includes multiple optical fibers extending between first ends and second ends. In accordance with same aspects of the disclosure, the second connectorized end 40 of the jumper cable 34 terminates the second ends of fewer optical fibers than the first connectorized end 36 of the jumper cable 34. For example, the first ends of the optical fibers are terminated by a first multi-fiber connector (e.g., MPO connector) at the first connectorized end 36 of the jumper cable 34. The second ends of at least some of the optical fibers are terminated by a second multi-fiber connector (e.g., MPO connector) at the second connectorized end 40 of the jumper cable 34. In certain examples, the second ends of less than all of the fibers are terminated at the second multi-fiber connector. For example, the second end of at least one of the optical fibers 37 is left unterminated.

The jumper cable 34 is disposed within the management module 24. The first multi-fiber connector 36 is disposed within the management module 24 at the first sealed fiber connection location 26. The second multi-fiber connector 40 is disposed within the management module 24 at the second sealed fiber connection location 38.

An additional distribution cable can be connected to the second sealed fiber connection location 38 at an exterior of the closure 15 to receive the optical signals carried to the second sealed fiber connection location 38. In certain examples, the additional cable has fewer optical fibers than the distribution cable 14. The additional distribution cable can be routed to another closure 15 at another network distribution point or to other structure located elsewhere in the network. In some examples, the additional distribution cable can be routed to a different type of enclosure having multiple sealed connection locations (e.g., ruggedized optical adapters having exterior ports).

In certain implementations, the enclosure defines sealed connection locations to facilitate fiber to the home (FTTH) deployment. In certain examples, the enclosure can include no more than twenty-four sealed connection locations. In certain examples, the enclosure can include no more than twelve sealed connection locations. In certain examples, the enclosure can include no more than eight sealed connection locations. In some examples, the enclosure can include a multi-service terminal (MST). In other examples, the enclosure can include a flexible service terminal (FST). It should be appreciated that alternative configurations are possible.

The second ends of the remaining fibers of the jumper cable 34 also are stored within the management module 24. For example, the second end of the optical fiber 37 is disposed within the management module 24. In an example, the second end of the optical fiber 37 is ready to be optically spliced to another optical fiber routed into the management module 24.

As shown in FIGS. 5 and 6, the second end of one or more of the optical fibers of the jumper cable 34 can be separately terminated. For example, FIG. 5 illustrates an example jumper cable 34' including optical fibers having first ends terminated by the first multi-fiber connector 36. At least some of the second ends are terminated by the second multi-fiber connector 40. The second end of a first 52 of the fibers is terminated at a single-fiber connector 54. Examples of single fiber connectors 54 include LC connectors, SC connectors, DLX connectors, LX 5 connectors, etc. As shown in FIG. 6, an example jumper cable 34" can include two or more single-fiber terminations 54, 56. It should be appreciated that many other jumper cable configurations are also possible.

In some implementations, one of the single-fiber connectors 54, 56 of the jumper cable 34', 34" is routed to the first port of the optical adaptor 66 within the management module 24 to form the first optical line 35. In certain implementations, multiple fiber pigtails can extend from the active equipment module 28 and be mated with multiple of the single-fiber connectors 54, 56 at one or more optical adapters disposed within the fiber management module 24. Accordingly, the optical signals received at the first sealed fiber connection location 26 can be directed to additional active equipment within the active equipment module 28.

In accordance with some aspects of the disclosure, the closure 15 can be utilized to upgrade the subscriber side of the network with an optical fiber infrastructure. For example, the closure 15 can be modified to enable optical signals received from the distribution cable 14 to be output to network subscribers (e.g., subscribers 18 in FIG. 1). In some implementations, an expansion module can be added to the closure 15. The expansion module defines one or more sealed drop cable ports accessible from an exterior of the closure 15. In certain examples, the second ends of one or more fibers of the jumper cable 34 are routed to the expansion module and connected to the sealed drop cable ports within the expansion module. One or more drop cables can be connected to exteriors of the sealed drop cable ports and routed to the subscribers (e.g., directly or via multi-service terminals or other network nodes).

Figure 7:
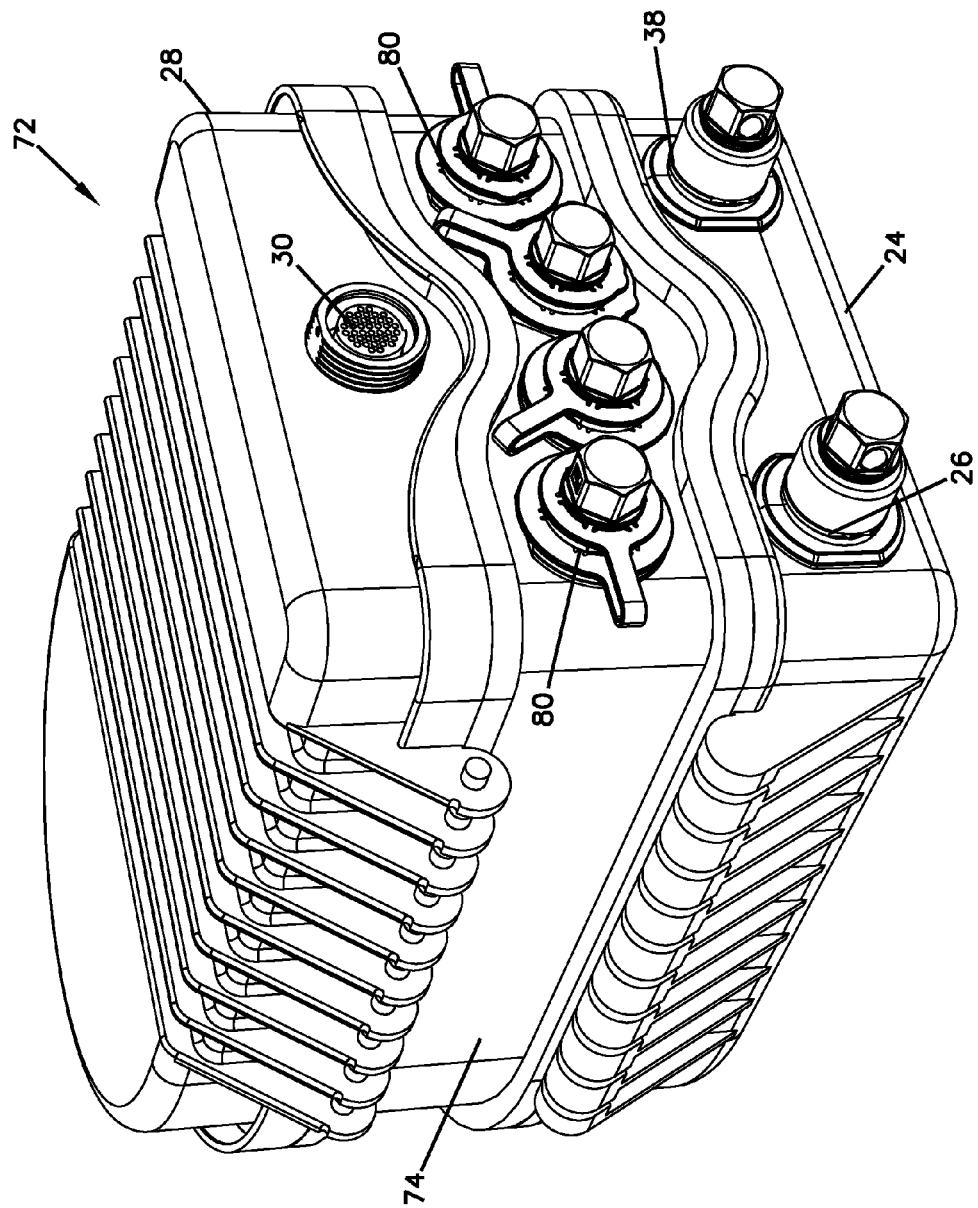
FIG. 7 is a perspective view of the closure of FIG. 2 with an expansion module disposed between the fiber management module and the active equipment module.
Figure 8:
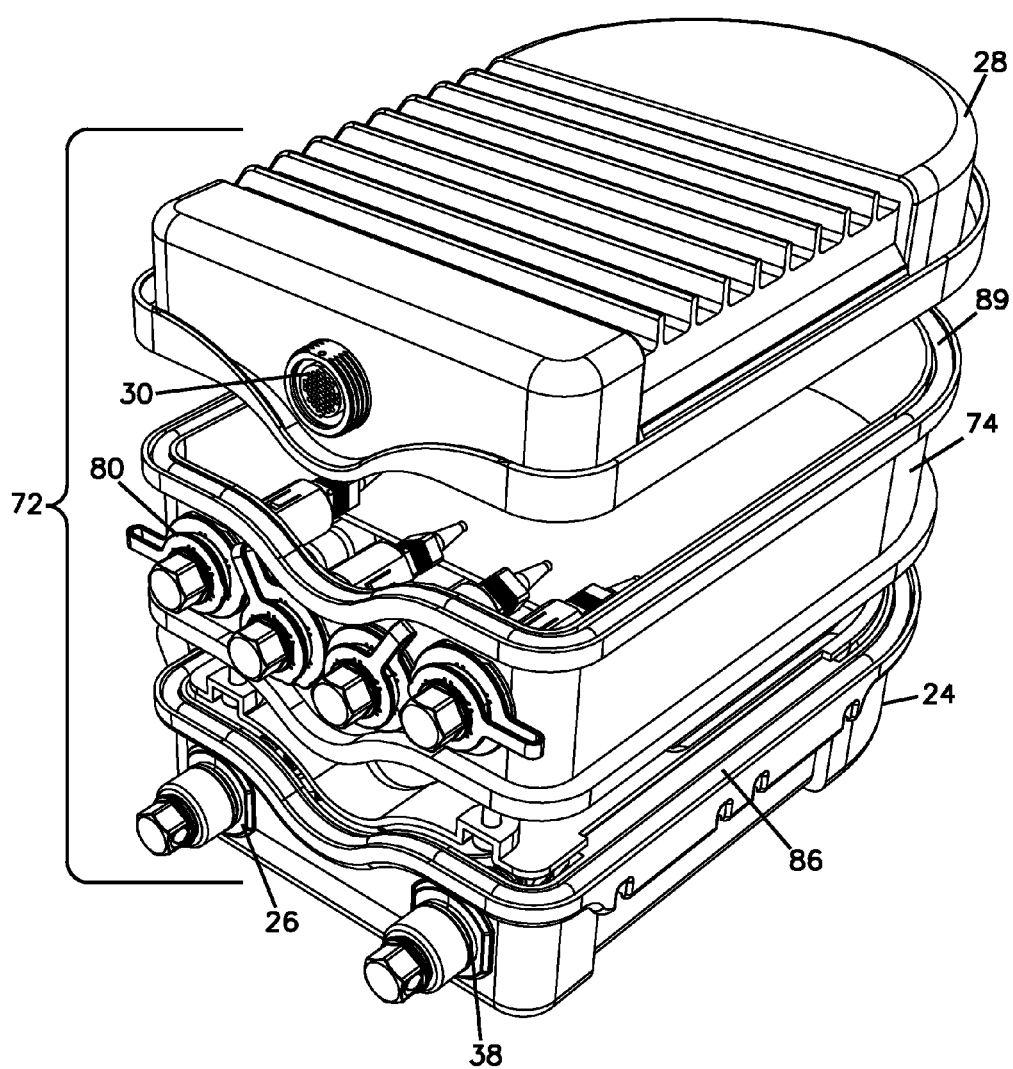
FIG. 8 is a partially exploded perspective view of the closure of FIG. 7.

FIGS. 7 and 8 illustrate one example closure 72 including a fiber management module 24, an active equipment module 28, and an expansion module 74. In certain implementations, the expansion module 74 is disposed between the fiber management module 24 and the active equipment module 28. The expansion module 74 can be sealingly coupled to the fiber management module 24 and to the active equipment module 28 to form a new sealed enclosure. For example, the expansion module 74 can be configured to mate with the management module 24 with a first watertight gasket 86 therebetween. The expansion module 74 can be configured to mate with the active equipment module 28 with a second watertight gasket 89 therebetween. In an example, the first watertight gasket 86 seats in a channel defined in the management module 24 and the second watertight gasket 89 seats in a channel defined in the expansion module 74. Other configurations are possible.

The expansion module 74 defines at least one sealed drop cable connection location 80. The sealed drop cable connection location 80 is configured to receive fewer fibers than the sealed fiber connection location 26. In certain examples, the sealed drop cable connection location 80 is configured to receive more fibers than the second sealed fiber connection location 38. In some implementations, the expansion module 74 defines between about two and twenty-four drop cable connection locations 80. In certain implementations, the expansion module 74 defines between about four and sixteen drop cable connection locations 80. In certain implementations, the expansion module 74 defines between about four and twelve drop cable connection locations 80. In certain implementations, the expansion module 74 defines between about eight and sixteen drop cable connection locations 80. In the example shown, the expansion module 74 defines four sealed drop cable connection locations 80. In the example shown, the expansion module 74 defines six sealed drop cable connection locations 80. In the example shown, the expansion module 74 defines eight sealed drop cable connection locations 80. It should be appreciated that many alternative configurations are also possible.

In some implementations, only a portion of the downstream network is upgraded with optical fiber cabling. In such cases, the expanded closure 72 includes the active equipment closure 28. In other implementations, however, the entire downstream network is upgraded with optical fiber cabling. In such cases, the signal converter is no longer useful and can be removed. In certain implementations, the active equipment module 28 is removed from the expansion module 74 and replaced with a cover (e.g., a metal or plastic cover). In an example, the cover does not define a sealed connection location. In other examples, the cover can define or cooperate with the expansion module 74 to define sealed drop cable connection locations 80.

The present disclosure provides a process of upgrading a subscriber network. For example, the disclosed closure 15 allows the upstream end of the network (i.e., the portion of the network upstream of the distribution point) to be cabled with optical fiber while allowing the downstream end of the network to remain cabled with electrical (e.g., copper) cables. In certain implementations, upgrading the network includes plugging a distribution cable 14 into a sealed fiber connection location 26 of a fiber management module 24; routing optical signals from the sealed fiber connection location 26 to a signal converter disposed within an active equipment module 28; and plugging an electrical cable 84 into a sealed electrical connection location 30 of the active equipment module 28. It should be appreciate that that alternative methods exist and can include a number of additional steps or have less steps.

In certain examples, the fiber management module 24 is pre-cabled so that a fiber line 35, 68 extends from the sealed fiber connection location 26 to the signal converter. For example, the pre-cabling can be implemented at a factory before the closure 15 is installed at the distribution point. In some implementations, the pre-cabling includes routing a connectorized end of a pigtail extending from the active equipment module 28 to a port of an optical adapter 66 disposed in the fiber management module 24. The pre-cabling also can include routing a connectorized end 54, 56 of a jumper cable 34 disposed within the management module 24 to another port of the optical adapter 66 to align with the connectorized end of the pigtail. In other implementations, the pigtail and jumper cable 34 can have unconnectorized ends that are spliced together within the management module 24.

In some implementations, the signal converter or other active equipment within the active equipment module 28 can be replaced or upgraded by detaching the active equipment module pigtail from the port of the optical adapter 66; detaching the active equipment module 28 from the fiber management module 24; attaching a new active equipment module to the fiber management module 24; and plugging or otherwise attaching an active equipment module pigtail extending from the new active equipment module to the port of the optical adapter 24. The active equipment module 28 can be replaced without modifying the connections of the first optical line 35.

In some implementations, the downstream end of the network can be upgraded with optical cabling. For example, the active equipment module 28 can be detached from the fiber management module 24; the expansion module 74 can be attached to the fiber management module 24; and the active equipment module 28 can be attached to the expansion module 74 to form an expanded closure 72. In certain examples, the expansion module 74 can be sealingly attached to the fiber management module 24 and/or to the active equipment module 28 with one or more watertight gaskets.

In certain examples, one or more fiber lines can be routed within the sealed enclosure 72 between the sealed fiber connection location 26 and the sealed drop cable connection locations 80. For example, in some implementations, one or more connectorized ends 54, 56 of the jumper cable 34 can be routed into the expansion module 74 from the fiber management module 24. In other implementations, one or more unconnectorized ends of the jumper cable 34 can be routed into the expansion module 74 to be spliced to fiber pigtails extending inwardly from the sealed drop cable connection locations 80. In still other implementations, one or more unconnectorized ends of the jumper cable 34 can be spliced in the fiber management module 24 to unconnectorized ends of fiber pigtails that extend inwardly from the sealed drop cable connection locations 80 and are routed to the fiber management module 24. One or more drop cables (e.g., each having one or more optical fibers) are coupled to the sealed drop cable connection locations 80 at an exterior of the expansion module 74. Accordingly, optical signals received at the sealed fiber connection location 26 are carried to the drop cables.

In some implementations, the active equipment module 28 cooperates with the expansion module 74 to protect the internal cabling within the expansion module 74. In other implementations, a cover can be attached to the expansion module 74 in place of the active equipment module 28. The cover cooperates with the expansion module 74 to define a sealed closure to protect internal cabling within the expansion module 74. It should be appreciated that many alternative configurations are also possible.

In view of the discussion above, it should be appreciated that the disclosure has applicability to copper and fiber optic systems (e.g., FTTdp systems and FTTH systems). The disclosure also has applicability to hardened connectivity systems. As discussed above, the goal of FTTdp is bringing a fiber network near the subscriber premises and interfacing with an existing copper network that extends to the subscriber premises.

In examples, the FTTdp closure system discussed above can include a plastic bottom portion (the fiber management module) for fiber management and a metal top portion (active equipment module) for housing electronic equipment (e.g., a circuit board with VDSL or G.fast technology).

In examples, the jumper cable 34 facilitates fiber management and enables optical connections in the field (e.g., outside of a factory setting) without requiring optical splicing, which may require a skilled worker and/or may be expensive and/or may be time consuming to perform.

In examples, an incoming flat distribution cable could be connected to the jumper cable 34 with an MPO connector. In some examples, less than all fibers of the jumper cable 34 can be terminated at a second optical connector. The other (i.e., spare) fibers of the jumper cable 34 can remain unconnectorized and stored in the fiber management module 24 or can be terminated with optical connectors. In an example, a twelve fiber jumper cable 34 is terminated at the first end by a twelve-fiber MPO connector. Second ends of about eight of the fibers are terminated by a second MPO connector (e.g., at an eight-fiber MPO connector, at a twelve-fiber MPO connector, at a twenty-four fiber MPO connector). The spare four fibers can be connectorized (e.g., using SC/APC connectors) or unconnectorized.

In an example, one of these optical connectors is used to connect with the equipment (e.g., VDSL or G. Fast) within the active equipment module 28. In other examples (e.g., having different topologies), the spare fibers also can be spliced or connected to an optical splitter for service to more subscribers.

In some examples, the ability to add a modular closure part (e.g., the expansion module 74) with hardened connectivity ports (e.g., sealed drop cable connection ports 80) to an existing distribution point closure 15 reduces the footprint of the whole (FTTdp/FTTH) system. At the same time, the expansion module option offers a cost saving solution because it utilizes a single closure for all FTTdp and FTTH services instead of multiple closures.

In examples, the closure 15, 72 also minimizes the need for splicing in the field and the need for skilled installers. It enables the installation to be done by installation crews trained for traditional electrical networks.

In examples, the fiber management in the closure 15, 72 is factory installed and designed to make the installation very simple (e.g., plug and play).

In examples, the combination of MPO, SC/APC connectors, and/or spare optical fibers in one (factory installed) jumper cable provides an easy installation to the active equipment and to the FTTH upgrade ports or products. In examples, using a factory installed MPO jumper cable with options for SC/APC connection or spare fibers reduces or avoids field splicing and extra complex fiber management in the field.

In examples, the option to add an FTTH hardened connectivity module (i.e., expansion module 74) to the initial closure 15 for FTTdp network connections reduces the number of additional closures needed to provide the FTTH service. Besides the cost saving advantages, a reduction of total footprint is significant, which is important when installing in compact hand holes, pole, and/or wall mounting.

LIST OF REFERENCE NUMERALS AND CORRESPONDING FEATURES 10 network
11 central office
12 fiber distribution cable
13 network nodes
14 distribution cable
15 closure
16 electrical distribution closure
18 subscribers
24 fiber management module
26 sealed fiber connection location
27 plastic body
28 active equipment module
29 body
30 sealed electrical connection location
32 ruggedized multi-fiber connector
34, 34', 34" jumper cable
35 a first optical line
36 first connectorized end
37 second end
38 second sealed fiber connection
40 second connectorized end
42 ruggedized multi-fiber optical adaptor
44 ruggedized multi-fiber optical adaptor
52 second end
54 a single fiber connector
56 a second single fiber connector
66 optical adaptor
68 a second optical line
70 connectorized end of pigtail
72 closure
74 expansion module
80 sealed drop fiber connection location
84 electrical cable
86 watertight gasket
88 cooling fins

What is claimed is:

1. A closure comprising:
a fiber management module having a first sealed fiber connection location and a second sealed fiber connection location accessible from an exterior of the fiber management module;
an active equipment module coupled to the fiber management module to form a sealed enclosure, the active equipment module having a sealed electrical connection location accessible from an exterior of the active equipment module, and the active equipment module containing a fiber-to-electrical signal converter that is electrically coupled to the sealed electrical connection location; and
a jumper cable having a first connectorized end plugged into an optical adaptor at the first sealed fiber connection location and a second connectorized end optically coupled to the first connectorized end, the second connectorized end being plugged into an optical adaptor at the second sealed fiber connection location, the jumper cable also including a third end optically coupled to the first connectorized end, the third end also being optically coupled to the fiber-to-electrical signal converter.

2. The closure of claim 1, wherein the active equipment module is removably coupled to the fiber management module.

3. The closure of claim 2, wherein the active equipment module is pivotally coupled to the fiber management module, the active equipment module being movable relative to the fiber management module between a closed position and an open position, wherein the jumper cable is not accessible from an exterior of the closure when the active equipment module is disposed in the closed position, and wherein the jumper cable is accessible when the active equipment module is disposed in the open position.

4. The closure of claim 2, further comprising a watertight gasket disposed between the fiber management module and the active equipment module.

5. The closure of claim 1, wherein the fiber management module includes a plastic housing body; and wherein the active equipment module includes a module body configured to dissipate heat.

6. The closure of claim 5, wherein the module body includes fins.

7. The closure of claim 5, wherein the module body includes metal.

8. The closure of claim 1, wherein the first and second sealed fiber connection locations include ruggedized multi-fiber optical adaptors; and wherein the first and second connectorized ends of the jumper cable include multi-fiber connectors.

9. The closure of claim 1, wherein the second connectorized end of the jumper cable terminates fewer optical fibers than the first connectorized end of the jumper cable.

10. The closure of claim 9, wherein the third end of the jumper cable is terminated by a single-fiber optical connector.

11. The closure of claim 10, wherein the single-fiber optical connector is routed to an optical adaptor disposed within an interior of the fiber management module; and wherein the active equipment module includes a fiber pigtail extending outwardly from the active equipment module and routed to the optical adaptor to interface with the single-fiber optical connector to form a fiber line between the first sealed connection location and the fiber-to-electrical signal converter.

12. The closure of claim 10, wherein at least a second optical fiber terminated at the first connectorized end of the jumper cable has a distal end that is left unterminated, the unterminated distal end being disposed within the fiber management module.

13. The closure of claim 1, wherein a fiber pigtail extends outwardly from the active equipment module, the fiber pigtail having a connectorized end disposed exterior of the active equipment module.

14. The closure of claim 1, further comprising an expansion module that is configured to mount between the fiber management module and the active equipment module, the expansion module having a sealed drop fiber connection location connecting to the first sealed fiber connection location.

15. The closure of claim 14, wherein the sealed drop fiber connection location is configured to receive fewer fibers than the first sealed fiber connection location.

16. The closure of claim 1, wherein the fiber-to-electrical signal converter is sealed within the active equipment module.

17. The closure of claim 1, wherein the first sealed fiber connection location is adapted to mate with a ruggedized multi-fiber connector from outside the fiber management module.

18. The closure of claim 1, wherein the first sealed electrical connection location is adapted to mate with a ruggedized multi-fiber connector from outside the fiber management module.

19. The closure of claim 1, wherein the active equipment module includes factory installed internal components.

20. The closure of claim 1, wherein the active equipment module includes factory installed internal components and has a tamper proof construction.

21. The closure of claim 1, wherein the closure is a plug-and-play connection between fiber input of the fiber management module and electrical outputs of the active equipment module.

* * * * *